United States Patent [19]

Sundberg

[11] 4,249,087

[45] Feb. 3, 1981

[54] POWER SUPPLY ARRANGEMENT FOR A NUMBER OF FUNCTIONAL UNITS DISTRIBUTED ALONG A TRANSMISSION LINE

[75] Inventor: Kjell G. Sundberg, Kungsängen, Sweden

[73] Assignee: Telefonaktiebolaget L M Ericsson, Stockholm, Sweden

[21] Appl. No.: 963,207

[22] Filed: Nov. 24, 1978

[30] Foreign Application Priority Data

Dec. 30, 1977 [SE] Sweden ............................. 7714977

[51] Int. Cl.³ ........................... H02J 1/04; H02J 1/06
[52] U.S. Cl. ..................................... 307/35; 307/237; 307/103
[58] Field of Search ................... 307/24, 29, 31, 33, 307/34, 35, 38, 39, 98, 99, 103, 130, 131, 150, 154, 297, 237, 200 A; 323/8

[56] References Cited

U.S. PATENT DOCUMENTS 3,628,127   12/1971   Waldhauer ........................... 307/35
4,063,147   12/1977   Hatanaka ............................. 307/35

Primary Examiner—L. T. Hix
Assistant Examiner—S. D. Schreyer
Attorney, Agent, or Firm—Hane, Roberts, Spiecens & Cohen

[57] ABSTRACT

A power supply system for a number of functional units distributed along a transmission in which each unit gets its supply from a constant voltage circuit connected across the transmission line. Each unit may have a low power and a high power state. The power supply which is located at one end of the transmission line is a constant voltage supply with current limiting features. The constant voltage circuits each comprises a Zener diode connected in series with an adjustable constant current circuit and a system for setting the constant current circuit on either the low or the high power state. When the high power state is set, the voltage across the constant current circuit is sensed and if this voltage is too high, the constant current is further increased until the current limiting of the power supply operates thereby decreasing the voltage across the constant current circuit to a safe value.

4 Claims, 2 Drawing Figures

POWER SUPPLY ARRANGEMENT FOR A NUMBER OF FUNCTIONAL UNITS DISTRIBUTED ALONG A TRANSMISSION LINE

Field of the Invention

The present invention relates to a power supply arrangement for a number of functional units distributed along a transmission line, for example, control or amplifier equipment through the transmission line.

Prior Art

In a transmission system, power is supplied to a number of branches by means of a power supply unit located at the end of the line. The power supply can, in principle, operate in one of two different ways. In a series supply, current is passed through a loop and at each branch there is connected a Zener diode across which the power supply current to the equipment located in the branch is taken out. The loop is hereby supplied with constant current. The disadvantage of this system is that due to the constant current there is a significant voltage drop across the entire line loop. The separation of the supply circuit and the signal circuit is furthermore complicated as the latter obviously must be connected in parallel.

On the other hand, in shunt supplies, lower current is obtained in the remote parts of the line seen from the supply point whereby the voltage drop per meter of line is reduced. Furthermore, a simpler branching is obtained by having signal and power taken out in the same way. In a shunt supply, the line is normally powered by a constant voltage source and the supply current of each branch is taken out across a Zener diode which is connected across the line's branches in series with a resistor.

Normally the branches are supplied with a low current for driving an electronic unit, which is prepared to start an operation cycle at a certain command. During the operation cycle a much larger current is running at the same time as the remaining units are disconnected. In order to give the most distant supply devices full working current, the voltage of the supply device's output must frequently be several hundred volts. The branches located closest to the supply device must undergo a very large voltage drop which contributes to a considerable power loss.

SUMMARY OF THE INVENTION

The present invention contemplates a circuit in a power supply system comprising a direct current source supplying through a transmission line a number of loading circuits connected across the line's branches and distributed along the line where each load circuit comprises a series circuit of an impedance and a Zener diode across which a constant voltage is taken out.

BRIEF DESCRIPTION OF THE DRAWING

The invention will be described in detail in connection with the accompanying drawing, where.

DETAILED DESCRIPTION

Figure 1:
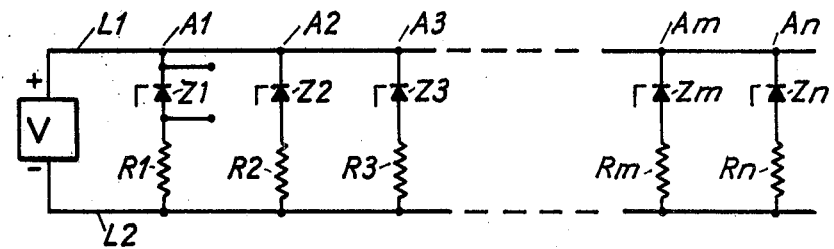
FIG. 1 is a circuit diagram for a known transmission system with a shunt power supply and FIG. 2 shows the circuits of a branching according to the invention.
Figure 2:
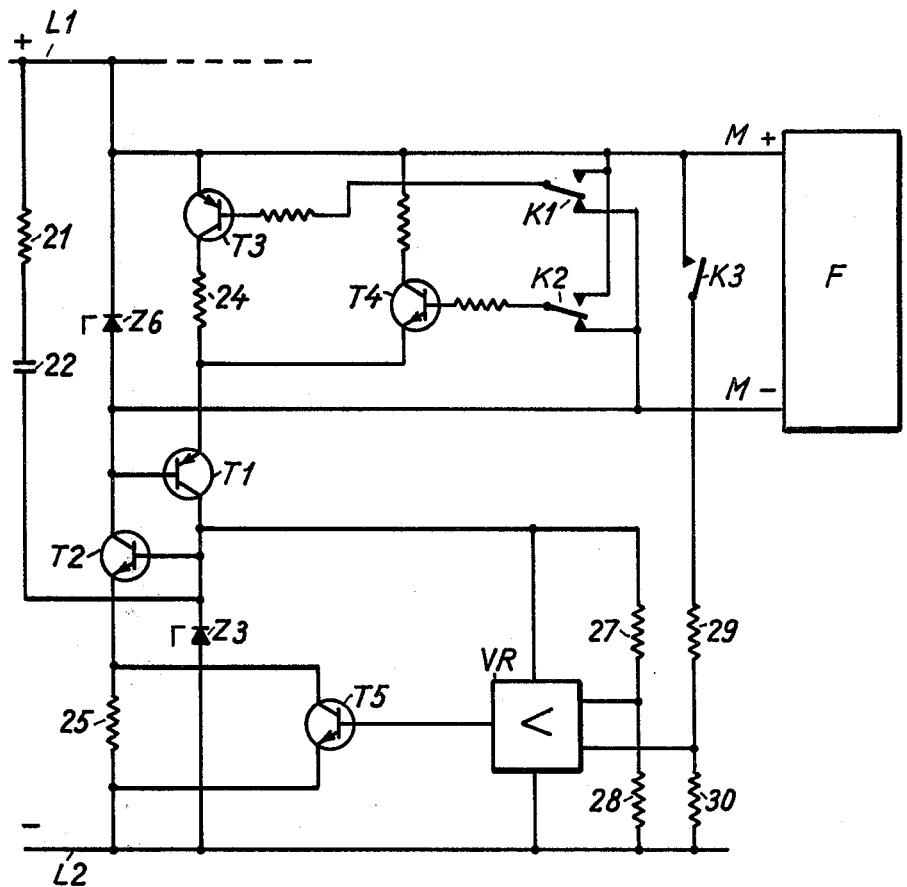

In FIG. 1, V designates a power supply unit of constant voltage type and L1, L2 transmission line. Along the transmission lines are distributed a number of branchings A1-An to channel units. The power supply of these units are taken out across constant voltage elements (e.g. Zener diodes Z1-Zn) which are connected across the lines L1, L2 in series with resistors $R1-R_n$ that take up the residual voltage drop. Depending on the position along the line, this residual voltage drop will vary greatly. In fault location equipment, the branchings are normally supplied with a relatively small current of the magnitude 1 mA which is enough to maintain a stand-by state. In this case, the power loss is not so high, even if the residual voltage drop is great. In an operational state, a considerably greater current is required by the operative unit while the remaining units are disconnected. By using the circuit shown in FIG. 2, combined with a power supply unit V provided with current limitation, the voltage quickly falls below a certain current limit enabling the power loss of a unit in the operational position to be limited to a harmless value.

A first series circuit consisting of a Zener diode Z6, the collector-emitter circuit of a transistor T2 and a resistance 25 is connected across the incoming line's branches L1 and L2. These elements correspond to, for example, the circuit Z1, R1 in FIG. 1. In parallel with the first series circuit there is a second series circuit consisting of the emitter-collector circuit of a transistor T3, resistance 24, the transistor T1 and the Zener diode Z3. The base of the transistor T1 is connected to the collector of the transistor T2 while the base of the transistor T2 is connected to the collector of the transistor T1. The transistor T3 is shunted by a transistor T4. The supply voltage of the functional unit F is taken out across the Zener diode Z6. The resistance 25 is shunted by a transistor T5 the base of which is supplied by a voltage sensitive circuit VR which, when the contact K3 is closed, senses the difference between the voltage across the Zener diode Z3 (through the voltage divider 27, 28) and the voltage M+ (through the voltage divider 29, 30). The bases of the transistors T3 and T4 can be connected to one of the voltage terminals M+ and M− through the contacts K1 and K2 respectively. The control of the contacts K1, K2, K3 is achieved through circuits in the unit F. Between the base of the transistor T2 and the branch L+ of the line there is a capacitor 22 connected in series with a resistance 21. The arrangement operates in the following way. In a stand-by state, all circuits consume a low current. The base of transistor T3 is connected to M− and is conducting while the transistor T4 is cut off by the same base voltage M−. The current through the transistors is unambiguously determined by the resistances 24 and 25 due to the emitter-base voltage being determined by the Zener diodes Z3 and Z6. The residual voltage drop is taken up by the base-collector diodes of the transistors due to the Zener diodes of the two parallel connected series circuits determining each other's base-emitter voltage. When all branches are in the stand-by state, the total current is lower than the limit at which the current limitation of the current source V enters.

When the functional unit F is supplied with a higher current, the base of the transistor T4 is coupled to M+ whereby the current through T1 increases and the transistor T2 may get more base current simultaneously as the current through the Zener diode Z3 may increase. The contact K3 is closed thus connecting the voltage divider 29, 30 and the circuit VR. The transistor T5 is made conductive shunting the resistance 25 so that the increasing current can pass through the transistor T2 to the functional unit F. If the residual voltage drop which must be taken up by the transistor T2 is large, the power loss in this transistor will be significant as the residual voltage drop remains unchanged. The voltage sensitive circuit VR is adjusted in such a way that when the residual voltage becomes too great, such current is driven through the transistor T5, that the current taken out from the power supply V becomes so great that its current limitation starts working. The current-voltage diagram of the current source V in the current limitation area is adjusted in such a way that the voltage drop becomes much greater for a low current change, for instance 10-20 times greater. By having the voltage sensitive circuit constantly measuring the residual voltage drop and regulating the current from the power source as a function thereof, all units, disregarding their position along the line, will be operating with a safe residual voltage.

As has been mentioned above, the remaining units are disconnected when any functional unit assumes its working state. This occurs by connecting the contact K1 to M+ whereby the transistor T3 is cut off. The current through the transistor T1 is cut off and the base supply to the transistor T2 ceases so that also this transistor is cut off. Even if the contact K1 is again connected to M−, the transistors T1 and T2 will remain cut off. Reconnection occurs, for example, by applying a positive pulse to the base of the transistor's T2. By means of the internal feed-back between the transistors T1 and T2, these operate as a bi-stable flip-flop and the first-mentioned transistor becomes conducting. The positive pulse can be obtained by momentarily disconnecting the voltage source causing the positive flank obtained at the time of re-connection to be transferred to the base of the transistor T2 through the capacitor 22.

The invention is not limited to the embodiment shown but can be modified within the scope of the claims. The transistor T3 may thus be connected to the emitter of T2 and the re-connection circuit 21, 22 may be connected between L2 and the base of the transistor T1.

We claim:

1. A power supply arrangement in a transmission system with a number of functional units distributed along a long transmission line which units obtain their power supply from a power supply unit located at one end of the transmission line in such a way that each functional unit gets its power supply from a constant voltage circuit connected across the branches of the line and where the functional units can assume a first functional state with low current consumption and a second functional state with a considerably higher current consumption, characterized in that the power supply (V) comprises a current limited constant voltage unit in which the voltage at an output limit current exceeding the sum of all the functional units' currents in the first state is drastically reduced with an increasing current, said constant voltage circuit (Z1, R1-$Z_n$, $R_n$) comprising a constant voltage unit (Zener diode Z6) connected in series with an adjustable constant current circuit (T1,T2,24,25), by means (T4,T5,VR) for alternatively adjusting said constant current circuit at said low or high current consumption, for sensing the voltage drop across the constant current circuit when the current consumption is high and for increasing the current through the constant current circuit further when said voltage drops exceeds a certain limit, causing the current limitation of the power supply unit to start functioning and lower the output voltage to an acceptable value.

2. Arrangement according to claim 1, wherein the constant current circuit comprises a first transistor (T2) the collector of which is connected to the constant voltage element (Z6) and the emitter of which is connected to the second line branch (L2) in series with a first resistance (25) and the base of which is connected, on the one hand, through a second constant voltage element (23) to the second line branch, and on the other hand, to the collector of the second transistor (T1), the emitter of which is connected to the first line branch (L1) in series with a second resistance (24) and the base of which is connected to the collector of the first transistor (T2).

3. Arrangement according to claim 2, wherein said means comprises on the one hand a third transistor (T4) the collector-emitter circuit of which is connected in parallel with the second resistance (24), and on the other hand a fourth transistor (T5) the collector-emitter circuit of which is connected in parallel with said fourth resistance (25), said fourth transistor (T5) being controlled by a voltage sensitive circuit (VR) which senses the voltage drop across the collector-base circuit of said first and second transistors (T2, T1).

4. Arrangement according to claim 3, comprising a switching device (transistor T3) for breaking the collector current in said first (T2) and second (T1) transistors by at least momentarily opening the emitter circuit of at least one of the last mentioned transistors and a reconnection circuit (21, 22) arranged to apply a voltage in the forward direction across the base-emitter circuit in either one of the first (T2) or second (T1) transistors.

* * * * *